(12) United States Patent
VanPutte

(10) Patent No.: US 6,406,797 B1
(45) Date of Patent: Jun. 18, 2002

(54) COEXTRUDED PACKAGING FILM

(75) Inventor: Andrew VanPutte, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/684,843

(22) Filed: Jul. 3, 1996

Related U.S. Application Data

(63) Continuation of application No. 08/336,719, filed on Nov. 9, 1994, now abandoned, which is a continuation of application No. 08/234,431, filed on Apr. 26, 1994, now abandoned, which is a continuation of application No. 07/905,993, filed on Jun. 25, 1992, now abandoned, which is a continuation-in-part of application No. 07/699,856, filed on May 14, 1991, now abandoned, which is a continuation-in-part of application No. 07/601,494, filed on Oct. 19, 1990, now abandoned, which is a continuation-in-part of application No. 07/525,440, filed on May 17, 1990, now abandoned.

(51) Int. Cl.$^7$ .......................... B32B 27/06; B32B 27/08

(52) U.S. Cl. ........................................ 428/515; 428/523

(58) Field of Search .................. 428/35.4, 220, 428/34.3, 36.1, 36.7, 520, 522, 523, 483, 424, 423, 401, 503, 515

(56) References Cited

U.S. PATENT DOCUMENTS

| | | |
|---|---|---|
| 2,155,999 A | 4/1939 | Procter et al. |
| 3,546,716 A | 12/1970 | Laumann ........................ 4/112 |
| 3,661,695 A | 5/1972 | Berliner ...................... 161/151 |
| 3,790,067 A | 2/1974 | Scheier .......................... 229/55 |
| 3,892,905 A | 7/1975 | Albert ........................... 428/220 |
| 4,288,497 A | 9/1981 | Tanaka et al. ................. 428/447 |
| 4,372,311 A | 2/1983 | Potts ............................ 128/287 |
| 4,551,369 A | 11/1985 | Belz ............................. 428/36 |

(List continued on next page.)

FOREIGN PATENT DOCUMENTS

| | | |
|---|---|---|
| EP | 0010171 | 9/1979 |
| EP | 0142950 | 5/1985 |
| EP | 0226439 | 6/1987 |
| EP | 337568 A3 | 10/1989 |
| EP | 407301 A1 | 1/1991 |
| EP | 457600 | 11/1991 |
| EP | 513692 | 11/1992 |
| GB | 1384791 | 2/1973 |
| JP | 6206644 | 3/1987 |
| JP | 02060906 A | 3/1990 |
| JP | 02108534 A | 4/1990 |
| JP | 02155999 A | 6/1990 |
| JP | 02163149 A | 6/1990 |
| WO | WO 92/01037 | 1/1992 |

OTHER PUBLICATIONS

US Novel Thermoplastic Air Products 1988.
US Vinol Air Products 1985.
US We Develop Plastics . . . Belland Jun. 1989.
US Vinol Polyvinyl Alcohols Air Products 1980.
US Vinex Thermoplastics . . . Air Products 1980.
US Polyox Water–Soluble . . . Union Carbide 1967.

*Primary Examiner*—Jose' G. Dees
*Assistant Examiner*—Michael A. Williamson
(74) *Attorney, Agent, or Firm*—Mark B. Quatt

(57) ABSTRACT

A coextruded packaging film has an outer and intermediate layer of fully hydrolyzed polyvinyl alcohol, partially hydrolyzed polyvinyl alcohol, or polyethylene oxide; and an inner layer comprising acid/acrylate copolymer, styrene maleic anhydride copolymer, ethylene acrylic acid copolymer, ionomer, cellulose, hydroxy propyl cellulose, polyether block amide copolymer, polyhydroxy butyric acid, polyhydroxy valeric acid, polyethylene oxide, polyester, copolyester, polyethyloxazoline, polyurethane, partially metal salt neutralized acid/acrylate copolymer, and a blend of acid/acrylate copolymer and ionomer. Fillers such as salt can optionally be added to one or more of the polymeric materials, prior to or during coextrusion of the film, to improve the processability of the film or to add a pigment to the film.

6 Claims, 1 Drawing Sheet

U.S. PATENT DOCUMENTS

| | | | |
|---|---|---|---|
| 4,612,355 A | 9/1986 | Belz | 526/65 |
| 4,620,999 A * | 11/1986 | Holmes | 428/35 |
| 4,672,956 A | 6/1987 | Potter et al. | 128/90 |
| 4,762,738 A * | 8/1988 | Keyes et al. | 428/36 |
| 4,772,663 A | 9/1988 | Marten et al. | 525/60 |
| 4,828,744 A | 5/1989 | Kaufmann et al. | 252/90 |
| 4,851,472 A | 7/1989 | Famili et al. | 525/60 |
| 4,870,148 A | 9/1989 | Belz et al. | 526/318 |
| 4,930,942 A | 6/1990 | Keyes et al. | 406/49 |
| 4,948,857 A | 8/1990 | Marten et al. | 526/329 |
| 4,973,416 A | 11/1990 | Kennedy | 252/90 |
| 4,990,146 A | 2/1991 | Deibig et al. | 604/332 |
| 5,108,807 A | 4/1992 | Tucker | 428/35 |

\* cited by examiner

COEXTRUDED PACKAGING FILM

This application is a Continuation of application Ser. No. 08/336,719 filed Nov. 9, 1994, now abandoned which is a Continuation of application Ser. No. 08/234,431, filed on Apr. 26, 1994, now abandoned which in turn is a Continuation of application Ser. No. 07/905,993 filed Jun. 25, 1992, now abandoned, which is a Continuation-In-Part of application Ser. No. 07/699,856, filed May 14, 1991, now abandoned, which in turn is a Continuation-In-Part of application Ser. No. 07/601,494, filed Oct. 19, 1990, now abandoned, which is a Continuation-In-Part of Ser. No. 07/525,440, filed May 17, 1990, now abandoned.

BACKGROUND OF THE INVENTION

The present invention relates to polymeric film, and more particularly to coextruded packaging film.

SUMMARY OF THE INVENTION

In one aspect of the invention, a packaging film comprises an outer layer comprising a material selected from fully hydrolyzed polyvinyl alcohol, partially hydrolyzed polyvinyl alcohol, and polyethylene oxide; an intermediate layer comprising a material selected from fully hydrolyzed polyvinyl alcohol, partially hydrolyzed polyvinyl alcohol, and polyethylene oxide; and an inner layer comprising a material selected from acid/acrylate copolymer, styrene maleic anhydride copolymer, ethylene acrylic acid copolymer, ionomer, cellulose, hydroxy propyl cellulose, polyether block amide copolymer, polyhydroxy butyric acid, polyhydroxy valeric acid, polyethylene oxide, polyester, copolyester, polyethyloxazoline, polyurethane, partially metal salt neutralized acid/acrylate copolymer, and a blend of acid/acrylate copolymer and ionomer.

In another aspect of the invention, a method for coextruding a packaging film comprises the steps of simultaneously extruding an outer layer comprising a material selected from fully hydrolyzed polyvinyl alcohol, partially hydrolyzed polyvinyl alcohol, and polyethylene oxide, an intermediate layer comprising a material selected from fully hydrolyzed polyvinyl alcohol, partially hydrolyzed polyvinyl alcohol, and polyethylene oxide, and an inner layer comprising a material selected from acid/acrylate copolymer, styrene maleic anhydride copolymer, ethylene acrylic acid copolymer, ionomer, cellulose, hydroxy propyl cellulose, polyether block amide copolymer, polyhydroxy butyric acid, polyhydroxy valeric acid, polyethylene oxide, polyester, copolyester, polyethyloxazoline, polyurethane, partially metal salt neutralized acid/acrylate copolymer, and a blend of acid/acrylate copolymer and ionomer; joining the layers together at an annular coextrusion die; and hot blowing the coextrudate to make the packaging film.

In an alternative method, the materials just described are simutaneously extruded; joined together at a sheet coextrusion die; and cast to make the packaging film.

BRIEF DESCRIPTION OF THE DRAWING

The invention may be further understood with reference to the sole drawing, FIG. 1, showing a cross-section of a film of the present invention.

DESCRIPTION OF THE PREFERRED EMBODIMENTS

Figure 1:
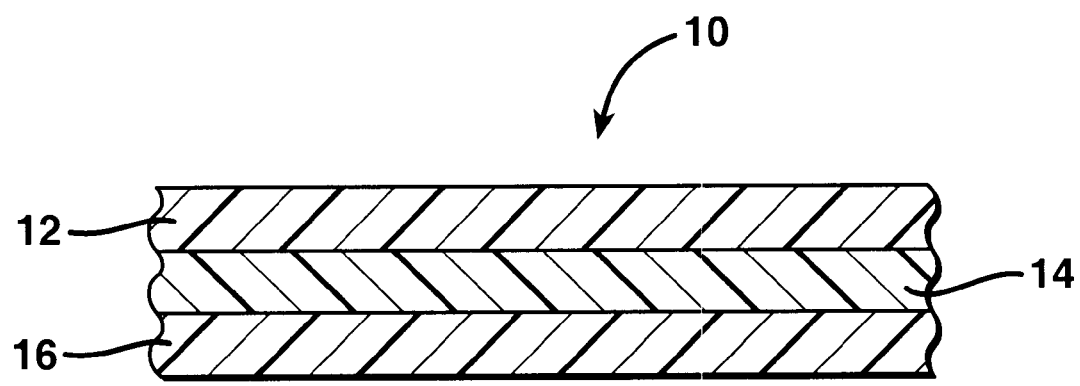

Referring to FIG. 1, a film 10 includes an outer layer 12.

This outer layer 12 is preferably a fully hydrolyzed polyvinyl alcohol (PVA) such as Vinex 1003 available from Air Products. Partially hydrolyzed polyvinyl alcohol, and polyethylene oxide, are alternative materials for layer 12.

Suitable materials for layer 16 include acid/acrylate copolymers, preferably methacrylic acid/ethyl acrylate copolymer such as that available from Belland as GBC 2580, 2600, and 2620; styrene maleic anhydride copolymer (SMA)(available as Scripset (trademark) from Monsanto); ethylene acrylic acid copolymer (EAA), or metal salt neutralized ethylene methacrylic acid copolymer (EMAA) known as ionomer (available from du Pont), in which the acid content of the EAA or EMAA is at least about 15 mole percent; cellulose; hydroxy propyl cellulose, such as that available from Aqualon as Klucel (trademark); polyether block amide copolymer (available as PEBAX (trademark) from Atochem); polyhydroxy butyric acid or polyhydroxy valeric acid (available as Biopol (trademark)resins from Imperial Chemical Industries); polyethylene oxide (POLYOX from Union Carbide); polyester or copolyester; polyethyloxazoline (PEOX 200 from Dow); polyurethane; partially metal salt neutralized acid/acrylate copolymer, and a blend of acid/acrylate copolymer and ionomer.

An optional layer 14 can also be advantageously used in the inventive laminate. Intermediate layer 14 includes a polymeric material which contributes to the tensile strength of the overall film. An especially preferred polymeric material for layer 14 is a partially hydrolyzed PVA such as Vinex 2034 or 2144 available from Air Products. Preferred partially hydrolyzed PVA materials have a degree of hydrolysis of preferably at least about 60%, and more preferably at least about 70%. Most preferably, such partially hydrolyzed PVA materials are hydrolyzed at between 85 and 98% hydrolysis.

Alternative materials also suitable for intermediate layer 14 are polyethylene oxide, such as that available from Union Carbide as Poly Ox WSR; and fully hydrolyzed polyvinyl alcohol.

Layer 14 can contribute to the tensile strength of the overall film, but also to such properties as bulk, abuse resistance, and the like.

The invention may be further understood by reference to the following example.

EXAMPLE 1

A fully hydrolyzed polyvinyl alcohol (Vinex 1003) was coextruded with a partially hydrolyzed polyvinyl alcohol (Vinex 2034), and a methacrylic acid/ethyl acrylate copolymer (Belland GBC 2580).

The annular coextrusion die was set at 400 to 410° F. The Vinex 2034 ran at a temperature of about 360 to 400° F. (extrusion temperature). The Vinex 1003 resin ran at a temperature of about 375 to 420° F. The Belland GBC 2580 ran at a temperature of about 320 to 360° F.

The coextrudate was hot blown, and the expanded material was cooled, and collapsed on a take-up roll.

The film of Example 1 had a total thickness of about 4.0 mils, with the outer layer of fully hydrolyzed PVA comprising about 1 mil; the intermediate layer of partially hydrolyzed PVA comprising about 2 mils; and the inner layer having a thickness of about 1 mil.

EXAMPLE 2

A film like that of Example 1 is made, but including a filler in the inner layer.

Such fillers can solve the tackiness problem by acting as an antiblock, which reduces blocking and improves processing and converting operations.

When properly selected, these fillers can also function as a pigment.

Fillers meeting one or more of these properties (antiblock effect, or pigment-bearing) are included in the base resin preferably in a masterbatch or "fully let down" form. The fillers are preferably of sufficiently small particle size for conversion to film. A particle size of about 5 microns or less is preferred.

The fillers can be compounded into the base resin on conventional compounding equipment such as a twin screw. Stainless steel cooling belts can be used, instead of water, to cool and/or quench the resulting strands. Such belts are commercially available from Sandvik and Berndorf. The compounded resin can then be used in conventional extrusion equipment to produce film.

Suitable fillers include salts, and more preferably alkali or alkaline earth salts such as sodium carbonate ($Na_2CO_3$); sodium sulfate ($Na_2SO_4$); sodium chloride (NaCl); potassium carbonate ($K_2CO_3$); potassium sulfate ($K_2SO_4$); and potassium chloride (KCl).

One or more of these fillers can be included in one or more of the layers of the film of the invention. The filler can be present in any suitable concentration in a given layer. Optimal concentrations will be governed to some extent by the nature of the filler, the nature of the base resin, the specific end use of the film, processing and packaging equipment, and other factors. A preferred concentration of the filler or fillers for a given layer of the film is between about 1000 parts per million (0.1%) and 200,000 parts per million (20%) by total weight of the layer.

Both discrete layers and coatings can be used for any of the layers of the inventive laminate.

While the present invention has been described with reference to preferred embodiments, those skilled in the art will understand that modifications in resin choice, film structure, and process may be made without departing from the scope of the invention as claimed below.

What is claimed is:

1. A coextruded film comprising:
    a) an outer layer comprising a material selected from the group consisting of fully hydrolyzed polyvinyl alcohol, partially hydrolyzed polyvinyl alcohol, and polyethylene oxide;
    b) an intermediate layer comprising a material selected from the group consisting of fully hydrolyzed polyvinyl alcohol, partially hydrolyzed polyvinyl alcohol, and polyethylene oxide; and
    c) an inner layer comprising a material selected from the group consisting of acid/acrylate copolymer, styrene maleic anhydride copolymer, polyether block amide copolymer, and polyethyloxazoline.

2. The film of claim 1 wherein the film includes a filler in at least one of the layers of the film.

3. The film of claim 2 wherein the filler is a salt.

4. The film of claim 3 wherein the salt is an alkali or alkaline earth salt.

5. The film of claim 3 wherein the salt is selected from the group consisting of sodium carbonate ($Na_2CO_3$); sodium sulfate ($Na_2SO_4$); sodium chloride (NaCl); potassium carbonate ($K_2CO_3$); potassium sulfate ($K_2SO_4$); and potassium chloride (KCl).

6. The film of claim 3 wherein the salt comprises between about 1000 parts per million (0.1%) and 200,000 parts per million (20%) by total weight of at least one of the layers of the film.

* * * * *